United States Patent [19]

Hosomura et al.

[11] Patent Number: 4,778,711

[45] Date of Patent: Oct. 18, 1988

[54] PAPER FOR RECEIVING TONER IMAGES IN ELECTROPHOTOGRAPHY

[75] Inventors: Hiroyoshi Hosomura; Katsumi Harada; Hiroshige Yamauchi, all of Kanagawa; Hitoshi Kuramoto, Tottori; Masao Ota, Tokyo, all of Japan

[73] Assignees: Fuji Xerox Co., Ltd.; Oji Paper Company Limited, both of Tokyo, Japan

[21] Appl. No.: 18,473

[22] Filed: Feb. 25, 1987

[30] Foreign Application Priority Data

Feb. 26, 1986 [JP] Japan .................................. 61-38974
Feb. 26, 1986 [JP] Japan .................................. 61-38975
Feb. 26, 1986 [JP] Japan .................................. 61-38976

[51] Int. Cl.[4] .................................................. B32B 3/00

[52] U.S. Cl. .................................... 428/211; 428/219; 428/511; 428/537.1; 346/135.1; 162/138; 427/121

[58] Field of Search ...................... 162/138; 346/135.1; 427/121; 428/211, 219, 511, 512, 513, 514, 537

[56] References Cited

U.S. PATENT DOCUMENTS 3,950,595 4/1976 Tanaka et al. ...................... 428/511
4,230,785 10/1980 Carlson et al. ........................ 430/56
4,245,025 1/1981 Kato et al. .......................... 430/126
4,328,265 5/1982 Kato et al. .......................... 427/146

FOREIGN PATENT DOCUMENTS 53086 5/1982 Japan .

*Primary Examiner*—John E. Kittle
*Assistant Examiner*—P. J. Ryan
*Attorney, Agent, or Firm*—Finnegan, Henderson, Farabow, Garrett and Dunner

[57] ABSTRACT

An electrophotographic image transfer paper for a copier including a fixing operation, comprises a sheet of raw paper, and a receiving layer on the paper for reducing blistering of the sheet during fixing of an image on the sheet, the receiving layer including a coating on at least one side of the sheet, having a center-line-average surface roughness not more than 2.0 micrometer and an air permeability less than or equal to 4,000 seconds.

14 Claims, 1 Drawing Sheet

PAPER FOR RECEIVING TONER IMAGES IN ELECTROPHOTOGRAPHY

BACKGROUND OF THE INVENTION

The present invention relates to a paper for receiving toner images in electrophotography. More particularly, the present invention relates to a paper that is capable of producing copies with high image quality in monochromatic or color electrophotographic copiers that are adapted for reproduction of images comparable to those attained by printing process.

Coated papers such as art paper are currently used in multicolor printing and other sophisticated areas of printing which chiefly depend on offset lithography. This is primarily due to the high level of surface smoothness of coated papers. This affords such advantages as more accurate and complete image reproduction because of the intimate contact between the paper and the ink film formed during printing, and good quality color reproduction because of high gloss of the image.

The adaptability of coated papers for electrophotography has been discussed by Tsukatani et al., who stated as follows: in physical terms, coated papers have smooth surfaces and will contact uniformly to an electrophotographic photoreceptor, so they would theoretically yield toner images having good aesthetic appeal after the transfer step. In fact, however, they have produced undesirable grainy images when used in existing copiers. Tsukatani and Ohta; "Paper for Non-impact Printers", Kami Pulp Gijutsu Times, 27, No. 4, 31–36, 1984. As a matter of fact, coated papers developed for printing are seldom used in electrophotography because they have none of the advantages normally associated with good image quality.

Independently of the review by Tsukatani et al., the present inventors have found that smooth-surfaced coated papers for printing will blister when toner images are fixed thereon during an electrophotographic process. This problem was found to occur irrespective of the fixing method employed, such as heated rolls or an oven. This is because the air permeability of the coated papers is too small to prevent the paper layer from peeling off the base sheet as a result of the thermal expansion of the water vapor in the paper.

Tsukatani et al. also reviewed a method for producing high-quality images in electrophotography and suggested, on the basis of comparison with conventional priting processes, certain approaches characterized by the use of finer toners or the formation of a thinner layer of transferred toner particles. Tsukatani and Ohta; "Paper for Non-impact Printers", Kami Pulp Gijutsu Times, 27, No. 3, 45–49, 1984. In this respect, the use of smooth-surfaced coated papers would afford certain advantages associated with image quality, if the problems encountered with coated printing papers in the electrophotographic process could be solved. It has also been found that smooth-surfaced coated papers used in electrophotography produce better results in the fixing step specifically intended for providing high image gloss and good color reproduction.

Paper for receiving a single-component magnetic toner images has been proposed for use in electrophotography. This paper has properties which are extremely close to the properties of coated papers (see Japanese Patent Publication Nos. 26026/1983, 24916/1982, 53592/1982 and 55139/1982).

To eliminate the formation of defective images during the transfer step resulting from generally low electrical resistivity, this paper is prepared by coating raw paper with coating color containing high-resistivity resin as a main component. However, in order to attain an appearance resembling that of plain paper, the coating weight has to be relatively small and the surface of the resulting paper is therefore insufficiently smooth to be usable in electrophotography for producing high-quality images. Although the coating applied to form this paper contains the same pigments as those employed in coatings used in the manufacture of coated printing paper, the pigment loading in the former case is much smaller than in the latter case, where pigments are used in large amounts chiefly for the purpose of providing smooth surfaces. There are several principal reasons for this small pigment loading in this paper. First, in the manufacture of electrophotographic image transfer paper, pigments are used in such amounts as to provide an appearance resembling that of plain paper. If the pigments are used in large amounts, the effect of the high-resistivity resins used may be impaired. Therefore, a level of surface smoothness that is comarable to that of coated printing paper is not attainable solely by increasing the coating weight. Furthermore, increased amount of coating weight can lead to "blocking" problems, which must be eliminated in order to produce paper suitable for use in an electrophotographic process as image receiving sheets.

An object, therefore, of the present invention is to solve the aforementioned problems of the conventional art and to provide an electrophotographic image transfer paper that will not blister during the fixing step and is capable of consistently producing copies with high image quality.

Another object of the invention is to minimize problems during feeding of paper to a copier caused by static friction between adjacent sheets.

Additional objects and advantages will be obvious from the description which follows or may be learned by practice of the invention.

SUMMARY OF THE INVENTION

In order to achieve the foregoing objects and advantages, and in accordance with the principles of the invention, as embodied and broadly described herein, the present invention is an electrophotographic toner image transfer paper for a copier which includes an operation for fixing the transferred toner image. The invention comprises a sheet of raw paper, and a receiving layer on the paper for reducing blistering of the sheet during fixing of an image on the sheet, the receiving layer including a coating on at least one side of the sheet, having a center-line average surface roughness not more than about 2.0 μm and an air permeability less than or equal to 4,000 seconds.

It is preferred that the coating includes pigments and adhesives and has a coating weight from 5 to 30 $g/m^2$ per one side of the sheet. The ratio of the pigments to the adhesives in the coating preferably is within the range of 95:5 to 60:40.

Preferably, the pigments have an average particle size of 1.5 μm or less. Also, the coating may have a surface electrical resistivity of at least about $8\times10^8$ ohms measured at a temperature of 20° C. and a relative humidity of 85%.

It is preferred that the standard deviation of the coefficient of static friction between adjacent sheets of the paper in a stack is less than or equal to 0.05. The coated layer also may include a lubricant in an amount from 0.1% to 5%, and/or the coated layer may include a coarse-grained pigment in an amount from 1% to 10%.

BRIEF DESCRIPTION OF THE DRAWING

The accompanying drawing, which is incorporated in and constitutes a part of the specification, illustrates the invention, and, together with the description, serves to explain the principles of the invention.

DETAILED DESCRIPTION OF THE PREFERRED EMBODIMENT

Figure 1:
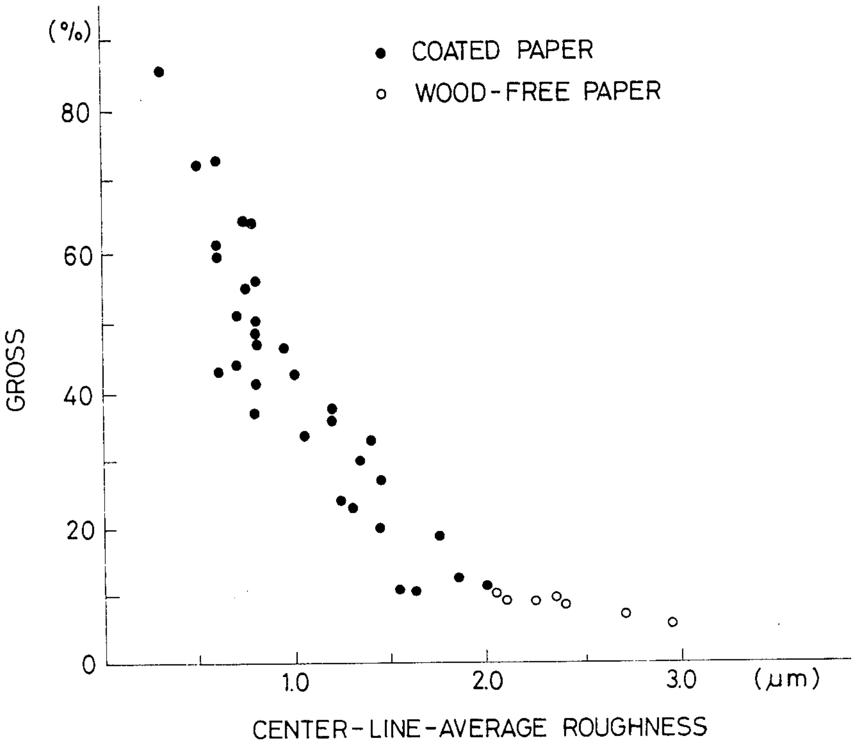
FIG. 1 is a graph showing the relationship between gloss and center-line-average roughness for coated paper and wood-free paper.

Reference will now be made in detail to the present preferred embodiment of the invention. The electrophotographic toner image transfer paper of the present invention is for a copier including a fixing operation. In accordance with the invention, the paper comprises a sheet of raw paper, and a receiving layer on the paper for reducing blistering of the sheet during fixing of toner images on the sheet, the receiving layer including a coating on at least one side of the sheet, having a center-line average surface roughness not more than 2.0 μm and an air permeability less than or equal to 4,000 seconds.

The effects of paper properties on color reproduction achieved by printing have been described by J. A. C. Yule. In his treatise on Color Reproduction, Mr. Yule indicates that the higher the surface gloss of paper and the smaller its ink absorbency, the less the color of the ink will be deteriorated. Another basic principle stated in this text is that coated papers will produce sharper images than non-coated papers. (J. A. C. Yule; Principles of Color Reproduction, John Wiley & Sons, Inc., 1967).

The present inventors studies the deterioration of the color of electrophotographic color toners fixed to commercially available coated printing paper and wood-free paper, as well as test samples of coated paper prepared by the present inventors. It was found that toner images transferred to coated paper experience smaller degrees of color deterioration than those transferred to wood-free paper, as in the case of printing. Thereafter, the present inventors measured the gloss of the tested papers with a GARDNER GLOSSGARD II, a gloss meter available from Gardner Corporation, U.S.A. In addition, the center-line-average surface roughness of each of these papers was measured with a SURFCORDER SE-3C (a universal surface profile meter available from Kosaka Laboratory Co., Ltd.) in accordance with the method specified in JIS B 0601 for a cutoff value of 0.8 mm over a sampling length of 8 mm. As a result of these measurements, a gloss vs. center-line-average roughness profile was obtained, which is depicted in the accompanying FIG. 1. The following conclusions may be drawn from the profile of FIG. 1. Approximately, 10% gloss is the point where wood-free paper may be distinguished from coated paper (which causes a smaller degree of color deterioration). However, this borderline is not very reliable, since both coated paper with a matte finish and wood-free paper have gloss values in the neighborhood of 10%, and are difficult to clearly distinguish from each other. These two kinds of paper can be distinguished in a more definitive manner by taking a center-line-average roughness of about 2 μm as an upper limit for coated paper. In addition, if the gloss of the paper itself is excessively low, the resulting image may have an inreased level of gloss and the copy may have an undesirably high degree of unevenness in gloss due to fusing of the color toner during fixing to achieve a satisfactory color density. In view of this point, the center-line-average surface roughness of the paper is desirably kept at no more than 1.5 μm, beyond which a gloss of 20% or more may occur.

The paper of the present invention which is suitable for receiving toner images in electrophotography can be produced by coating at least one side of raw paper, then smoothing the coated surface and conditioning it to provide an air permeability of no more than 4,000 seconds. The chief components of the coating typically are pigments that impart air permeability to the coating, and adhesives that impart high resistivity to the coating and bind pigments to the raw paper.

After application of the coating, the coated surface is smoothed by a suitable technique such as supercalendering. Therefore, the pigment used as the chief component of the coating is preferably composed of fine particles that have an average size of 1.5 μm or less and more preferably, 1.0 micrometer or less, and which are capable of imparting air permeability to the coating layer. If the pigment has an average particle size exceeding about 1.5 micrometer, satisfactory results may not be attained by smoothing treatments, or a coating having insufficient air permeability may be formed.

Pigments that have small average particle sizes and high levels of oil absorption are suitable for imparting air permeability to the coating layer, and illustrative examples of some materials that satisfy these requirements include ground calcium carbonate, precipitated calcium carbonate, silica, calcined clay, aluminum hydroxide, lithopone, zinc oxide, titanium dioxide, barium sulfate and urea resin powder. Kaolin clays, sericite and ZIECLITE (kaolinite and sericite mixture) have small average particle sizes and are effective for smoothing purposes, but care must be exercised in incorporating them in the coating, since they are composed of sheet-shaped particles and have a tendency to lower the air permeability of the coating.

The adhesive used in the coating may be selected from among water-soluble adhesives, emulsions and lattices that adhere strongly to the pigments and raw paper and afford less blocking properties. Such water-soluble adhesives, emulsions and lattices may be used either independently or in admixture. Illustrative examples of such adhesives include water-soluble resins such as polyvinyl alcohol, starches, methyl cellulose, hydroxyethyl cellulose, styrene/acrylic resin, isobutylene/maleic anhydride resin, and carboxymethyl cellulose, acrylic emulsion, vinyl acetate emulsion, vinylidene chloride emulsion, polyester emulsions, styrene/-butadiene latex and acrylonitrile/butadiene latex. Among these adhesives, resins having lower degrees of polymerization and comparatively rigid resins which have minimum film-forming temperatures of 0° C. or higher are desirably used for the purpose of providing satisfactory air permeability.

In order to achieve an adequately efficient toner transfer to avoid the formation of defective images, the paper of the present invention is desirably conditioned to provide the receiving layer with a surface electrical resistivity of at least $8.0\times10^8$ ohms at a temperature of 20° C. and a relative humidity (RH) of 85%. For this purpose, a pigment may be selected from among materials having high electrical resistivity, such as ground calcium carbonate, precipitated calcium carbonate, calcined clay, lithopone, zinc oxide, titanium dioxide, barium sulfate and urea resin powder. Kaolin clays, sericite, ZIECLITE (kaolinate and sericite mixture), talc, and other materials containing water of crystallization have relatively low electrical resistivity and are not desirable for use as the principal pigment component.

In order to minimize the variation of electrical resistivity at small undulations on the paper surface and to prevent a decrease in electrical resistivity at high humidity, use of the adhesives containing emulsifiers and other low electrical resistivity adhesive components should be avoided or minimized. For instance, self-crosslinking acrylic resins may be reacted with less than 5 mol% of the resin of carboxylic acids so as to prepare soapless self-crosslinking acrylic emulsions without employing any emulsifier. Advantageous carboxylic acids are acrylic acid, methacrylic acid, itaconic acid and maleic anhydride, but using these in amounts of 5 mol% or more preferably should be avoided in order to prevent an undesirable drop in electrical resistivity. The cross linking reaction may be initiated by a variety of mechanisms such as the reaction between the carboxyl group and an epoxy resin, self-crosslinking of amide, the reaction between the carboxyl group and a melamine resin, and the reaction between the hydroxyl group and a melamine resin.

Amphoteric lattices that contain small amounts of emulsifiers may also be used as adhesives. For instance, mixtures of an aliphatic conjugated diolefinic monomer, a monoolefinic monomer, an ethylenically unsaturated acid monomer and an ethylenically unsaturated amine monomer may be polymerized with the aid of no more than 1 weight % of an emulsifier on the basis of the total weight of the monomers, under such conditions that an unsaturated acid monomer and an unsaturated amine monomer will not simultaneously exist in the polymerization system. Some of the lattices obtained by this method will be stabilized by volatile alkaline substances, such as ammonia, to form a gel in the pH range of 3.5 to 8.5. If a mixture of these amphoteric lattices and a suitable pigment is coated onto raw paper and dried, the lattices will gel when the alkaline substance is evaporated and provide good adhesion to the pigment particles. This contributes to the formation of a coating having improved electrical resistivity. Illustrative aliphatic conjugated diolefinic monomers include 1,3-butadine, 2-methyl-1,3-butadiene, and 2-chloro-1,3-butadiene. Illustrative monoolefinic monomers include styrene, α-methylstyrene, monochlorostylene, acrylic acid esters, methacrylic acid esters, and acrylonitrile. Examples of ethylenically unsaturated acid monomers include acrylic acid, methacrylic acid, itaconic acid, fumaric acid, crotonic acid and cinnamic acid. Illustrative ethylenically unsaturated amine monomers include methylaminoethyl methacrylate, t-butylaminoethyl methacrylate, dimethylaminoethyl methacrylate, diethylaminoethyl methacrylate, and dibutylaminoethyl methacrylate.

The above-described soapless self-crosslinking acrylic emulsions and amphoteric lattices may be used either independently or in admixture. They may also be used in combination with water-soluble resins, such as polyvinyl alcohol, starches, methyl cellulose, hydroxyethyl cellulose and styrene/acrylic resins, in amounts that are not detrimental to the purpose of providing high electrical resistivity.

The coating used in the production of the paper of the present invention may incorporate various additives, such as dyes and color pigments to achieve tone adjustment, and fluorescent dyes to provide improved visual whiteness. Dispersants and antifoaming agents may also be employed to facilitate the procedures of coating preparation.

In a more preferred embodiment of the present invention, at least one surface of raw paper is coated with a coating having a base pigment of reduced stickiness and an adhesive and which optionally contains an anti-sticking agent. The surface of the coating is subsequently smoothed to produce a paper having a standard deviation of a coefficient of static friction with a layer of an adjacent sheet of paper of not more than about 0.05. The paper prepared in this manner is adapted to receive toner images in electrophotography, and can produce copies with consistently high image quality while avoiding problems such as jamming or multiple sheets feeding.

The ratio of the pigment to adhesive in the coating is desirably within the range of about 95:5 to about 60:40. By means of subsequent smoothing, a center-line-average roughness of 2 micrometer (≧about 10% gloss of paper) may be achieved. A more desirable pigment-to-adhesive ratio is within the range of 95:5 to 70:30, since this range provides a center-line-average roughness of 1.5 micrometer (≧about 20% gloss of paper). If the proportion of the pigment exceeds about 95%, the strength of the resulting coating film may be decreased. This can lead to problems during paper manufacture, or may result in inefficient toner fixing after image transfer. If the pigment loading is less than 60%, the desired center-line-average roughness or gloss on white paper may not be attained by subsequent smoothing treatments. If the content of pigment is even smaller, for example, less than 40%, other problems can occur such as blocking between adjacent sheets of paper (or problems in writing with pen and pencil on the paper).

The coating is preferably applied in an amount of 5 to 30 $g/m^2$ per sheet side. If the coating weight is less than 5 $g/m^2$ per sheet side, the desired center-line-average roughness and the gloss of the coated paper may not be attained. If the coating weight of the coating exceeds 30 $g/m^2$ per sheet side, the paper not only may blister during fixing, but also may have insufficient stiffness to ensure smooth feeding through a copier.

It sometimes occurs that combinations of pigment and adhesive alone are not sufficient to produce a standard deviation of a coefficient of static friction between adjacent sheets stacked in a copier paper feed mechanism of no more than 0.05. In such cases, the coated layer on each sheet of paper may be provided with better slip properties through incorporation of a lubricating chemical. Alternatively, an air layer may be provided between adjacent sheets of paper through incorporation of a coarse-grained pigment in a small amount that will not reduce the image gloss. The average particle size of the pigment used on the recording side of the coated paper also may be varied from that of the pigment used on the non-recording side. A fine-grained pigment may be used on the recording side in order to ensure high image gloss, whereas a coarse-grained pigment is used on the opposite side to provide an air layer.

Illustrative coarse-grained pigments include inorganic pigments such as ground calcium carbonate, aluminum hydroxide, clay and talc which have average particle sizes of 2 to 20 micrometer; and organic pigments such as starch particles, polyvinyl alcohol powder, epoxy resin powder and polypropylene resin powder. When these coarse-grained pigments are incorporated in the non-recording side of coated paper, they may be the only pigment used on the non-recording surface. However, if coarse-grained pigments are incorporated in the recording surface, their content should be limited within the range of 1 to 10%, so as not to decrease the image gloss.

Illustrative chemicals that can be used to impart lubricity to the coating include metal salts of aliphatic acids such as calcium stearate, aliphatic acid amides such as stearic acid amide, as well as polyethylene emulsions and silicone resin powder. These lubricants can achieve their intended effects if they are present in the coating in amounts of 0.1 to 5%.

The coatings described in the foregoing pages may be applied by a variety of known coating techniques such as blade coating, air-knife coating, roll coating and bar coating. A smoothing operation may be accomplished by passing the coated paper successively through the nips of a stack of alternating rigid and flexible rolls in a supercalender or gloss calender machine. The conditions of smoothing treatment should be so adjusted that a center-line-average surface roughness of no more than 2.0 micrometers, and preferably no more than about 1.5 micrometers, as measured in accordance with JIS B 0601, is attained in order to produce a satisfactory gloss on the image. In order to attain the necessary center-line-average roughness, proper adjustment of the conditions for the smoothing operation may be insufficient and other factors such as the particle size of pigment, the content of the pigment, the coating weight and the coating method also should be taken into consideration.

The raw paper used in the present invention may be selected from a wide variety of papers including acidic and neutral wood-free and partially wood-free (ground pulp ≦30%) papers. In order to impart properties such as good running and anti-curl characteristics necessary for ensuring adaptability to the electrophotographic process, the ingredients of stock, its preparation and the conditions for subsequent steps of raw paper manufacture are preferably controlled by the known methods described in Japanese Patent Publication Nos. 47385/1980 and 81270/1982, which descriptions are hereby incorporated by reference.

The present invention is hereunder described in greater detail with reference to the following working examples and comparative examples, wherein all parts are based on weight.

EXAMPLE 1

A stock containing 100 parts ob bleached hardwood kraft pulp (LBKP) that had been beaten to Canadian standard freeness of 530 cc, 10 parts of clay, 2 parts of starch, 1.5 parts of rosin size, and 1 part of aluminum sulfate was processed to make wood-free paper having a base weight of f50 g/m$^2$. Both sides of this paper were air-knife coated with a coating containing 65 parts of precipitated calcium carbonate (BRILLIANT 15 of Shiraishi Kogyo K.K.; average particle size, 0.15 micrometer), 20 parts of kaolin clay (HYDROGLOSS 90 of Huber Corporation), 10 parts of a vinyl acetate/acrylic emulsion (MOWINYLE 770 of Hoechst Gosei K.K.; minimum film-forming temperature, 11° C.), and 5 parts of oxidized starch (ACE A of Oji Cornstarch Co., Ltd.). The paper was dried to provide a coating weight of 12 g/m$^2$ for each of the felt side (F side) and the wire side (W side). The coated paper was then smoothed by a supercalender machine to produce a sheet of copying paper.

EXAMPLE 2

A stock containing 100 parts of bleached hardwood kraft pulp (LBKP) that had been beaten to Canadian standard freeness of 530 cc, 10 parts of clay, 2 parts of starch, 1.5 parts of rosin size and 1 part of aluminum sulfate was processed to make wood-free paper having a base weight of 65 g/m$^2$. Both sides of this paper were air-knife coated with a coating containing 60 parts of wet ground calcium carbonate (CARBITAL 90 of Fuji Kaolin K.K.; average particle size, 0.6 micrometer), 20 parts of silica powder (SYLOID 244 of Fuji Davison Co., Ltd.; average particle size, 3.3 micrometer), 18 parts of an acrylic emulsion (MOWINYLE 9000 of Hoechst Gosei K.K.; minimum film-forming temperature, 30° C.) and 2 parts of oxidized starch. The paper was dried to provide a coating weight of 13 g/m$^2$ for each of the F and W sides. The coated paper was then smoothed by a supercalender machine to produce a sheet of copying paper.

EXAMPLE 3

Wood-free paper was made as in Example 2 and both sides thereof were air-knife coated with a coating containing 20 parts of ground calcium carbonate (NS-2500 of Nitto Funka Kogyo K.K.; average particle size, 0.89 micrometer), 65 parts of barium sulfate (#100 of Sakai Chemical Industry Co., Ltd.; average particle size, 0.6 micrometer), 13 parts of a styrene-butadiene latex (LX-303 of Nippon Zeon Co., Ltd.; minimum film-forming temperature, 20° C.) and 2 parts of polyvinyl alcohol (POVAL 105 of Kuraray Co., Ltd.). The paper was dried to provide a coating weight of 15 g/m$^2$ for each of the F and W sides. The coated paper was then smoothed by a supercalender machine to produce a sheet of copying paper.

EXAMPLE 4

Wood-free paper was made as in Example 2 and both sides thereof were blade coated with a coating containing 20 parts of ground calcium carbonate (NS-2500 of Nitto Funka Kogyo K.K.; average particle size, 0.89 micrometer), 65 parts of barium sulfate (#100 of Sakai Chemical Industry Co., Ltd.; average particle size, 0.6 micrometer), 13 parts of a styrene/butadiene latex (LX-303 of Nippon Zeon Co., Ltd.; minimum film-forming temperature, 20° C.) and 2 parts of polyvinyl alcohol (POVAL 105 of Kuraray Co., Ltd.). The paper was dried to provide a coating weight of 15 g/m$^2$ for each of the F and W sides. The coated paper was then smoothed by a supercalender machine to produce a sheet of copying paper.

EXAMPLE 5

Wood-free paper was made as in Example 2 and both sides thereof were air-knife coated with a coating containing 60 parts of calcined clay (ANSILEX 93 of EMC Corporation; average particle size, 0.6 micrometer), 20 parts of ground calcium carbonate (NS-1000 of Nitto Funka Kogyo, K.K.; average particle size, 1.17 micrometer), 15 parts of a styrene-butadiene latex (LX-303 of Nippon Zeon Co., Ltd.) and 5 parts of polyvinyl alcohol (POVAL 117 of Kuraray Co., Ltd.). The paper was dried to provide a coating weight of 15 g/m$^2$ for each of the F and W sides. The coated paper was then smoothed by a supercalender machine to produce a sheet of copying paper.

EXAMPLE 6

A stock containing 100 parts of bleached hardwood kraft pulp (LBKP) that had been beaten to Canadian standard freeness of 460 cc, 12 parts of talc, 2 parts of starch, 1.5 parts of rosin size and 1 part of aluminum sulfate was processed to make wood-free paper having a base weight of 65 g/m$^2$. Both sides of this paper were blade coated with a coating containing 90 parts of precipitated calcium carbonate (BRILLIANT 1500 of Shiraishi Kogyo K.K.; average particle size, 0.15 micrometer), 8 parts of an amphoteric latex (this was prepared by copolymerizing 2 parts of diethylaminoethyl methacrylate with a latex that had been preliminarily obtained by polymerizing 60, 37 and 3 parts of styrene, butadiene and methacrylic acid, respectively), and 2 parts of oxidized starch (ACE A of Oji Cornstarch Co., Ltd.). The paper was dried to provide a coating weight of 15 g/m$^2$ for each of the F and W sides. The coated paper was then smoothed by a supercalender machine to produce a sheet of copying paper.

EXAMPLE 7

A stock containing 100 parts of bleached hardwood kraft pulp (LBKP) that had been beaten to Canadian standard freeness of 460 cc, 12 parts of talc, 2 parts of starch, 1.5 parts of rosin size and 1 part of aluminum sulfate was processed to make wood-free paper having a base weight of 65 g/m$^2$. Both sides of this paper were air-knife coated with a coating containing 85 parts of precipitated calcium carbonate (BRILLIANT 1500 of Shiraishi Kogyo K.K.; average particle size, 0.15 micrometer), 13 parts of an amphoteric latex (this was prepared by copolymerizing 2 parts of diethylaminoethyl methacrylate with a latex that had been preliminarily obtained by polymerizing a 60:37:3 monomer mixture of styrene, butadiene and methacrylic acid), and 2 parts of oxidized starch (ACE A of Oji Cornstarch Co., Ltd.). The paper was dried to provide a coating weight of 15 g/m$^2$ for each of the F and W sides. The coated paper was then smoothed by a supercalender machine to produce a sheet of copying paper.

EXAMPLE 8

Wood-free paper was made as in Example 6 and both sides thereof were air-knife coated with a coating containing 58 parts of ground calcium carbonate (NS-1000 of Nitto Funka Kogyo K.K.; average particle size, 1.17 micrometer), 29 parts of wet ground calcium carbonate (CARBITAL 90 of Fuji Kaolin K.K.; average particle size, 0.6 micrometer), 8 parts of a soapless self-crosslinking acrylic emulsion (JULIMER SEK 101 of Nippon Junyaku Co., Ltd.) and 5 parts of polyvinyl alcohol (POVAL 117 of Kuraray Co., Ltd.). The paper was dried to provide a coating weight of 13 g/m$^2$ for each of the F and W sides. the coated paper was then smoothed by a supercalender machine to produce a sheet of copying paper.

EXAMPLE 9

Wood-free paper was made as in Example 6 and both sides thereof were air-knife coated with a coating containing 58 parts of precipitated calcium carbonate (BRILLIANT 1500 of Shiraishi Kogyo K.K.; average particle size, 0.15 micrometer), 29 parts of wet ground calcium carbonate (CARBITAL 90 of Fuji Kaolin, K.K.; average particle size, 0.6 micrometer), 8 parts of a soapless self-crosslinking acrylic emulsion (JULIMER SEK 101 of Nippon Junyaku Co., Ltd.) and 5 parts of polyvinyl alcohol (POVAL 117 of Kuraray Co., Ltd.). The paper was dried to provide a coating weight of 13 g/m$^2$ for each of the F and W sides. The coated paper was then smoothed by a supercalender machine to produce a sheet of copying paper.

EXAMPLE 10

Wood-free paper was made as in Example 6 and both sides thereof were air-knife coated with a coating containing 45 parts of precipitated calcium carbonate (BRILLIANT 1500 of Shiraishi Kogyo K.K.; average particle size, 0.15 micrometer), 20 parts of wet ground calcium carbonate (CARBITAL 90 of Fuji Kaolin K.K.; average particle size, 0.6 micrometer), 30 parts of a soapless self-crosslinking acrylic emulsion (JULIMER SEK 101 of Nippon Junyaku Co., Ltd.) and 5 parts of polyvinyl alcohol (POVAL 117 of Kuraray Co., Ltd.). The paper was dried to provide a coating weight of 7 g/m$^2$ for each of the F and W sides. The coated paper was then smoothed by a supercalender machine to produce a sheet of copying paper.

EXAMPLE 11

Wood-free paper was made as in Example 6 and both sides thereof were air-knife coated with a coating containing 60 parts of calcined clay (ANSILEX 93 of EMC Corporation; average particle size, 0.6 micrometer), 20 parts of ground calcium carbonate (NS-1000 of Nitto Funka Kogyo, K.K.; average particle size, 1.17 mimcrometers), 15 parts of a soapless self-crosslinking acrylic emulsion (JULIMER SEK 301 of Nippon Junyaku Co., Ltd.) and 5 parts of polyvinyl alcohol (POVAL 117 of Kuraray Co., Ltd.). The paper was dried to provide a coating weight of 15 g/m$^2$ for each of the F and W sides. The coated paper was then smoothed by a supercalender machine to produce a sheet of copying paper.

EXAMPLE 12

Wood-free paper was made as in Example 6 and both sides thereof were blade coated with a coating containing 85 parts of precipitated calcium carbonate (BRILLIANT 1500 of Shiraishi Kogyo K.K.; average particle size, 0.15 micrometer), 13 parts of an amphoteric latex (this was prepared by copolymerizing 2 parts of diethylaminoethyl methacrylate with a latex that had been preliminarily obtained by polymerizing a 60:37:3 monomer mixture of styrene, butadiene and methacrylic acid), 2 parts of oxidized starch (ACE A of Oji Cornstarch Co., Ltd.) and 2 parts of calcium stearate (NOPCOTE C-104; a lubricant produced by Sun Nopco Corporation). The paper was dried to provide a coating weight of 15 g/m$^2$ for each of the F and W sides. The coated paper was then smoothed by a supercalender machine to produce a sheet of copying paper.

COMPARATIVE EXAMPLE 1

Wood-free paper was made as in Example 1 and both sides thereof were blade coated with a coating containing 87 parts of kaolin clay (ULTRA WHITE 90 of EMC Corporation), 10 parts of a styrene-butadiene latex (JSR0632 of Japan Synthetic Rubber Co., Ltd.) and 3 parts of oxidized starch (ACE A of Oji Cornstarch Co., Ltd.). The paper was dried to provide a coating weight of 15 g/$m^2$ for each of the F and W sides. The coated paper was then smoothed by a supercalender machine to produce a sheet of copying paper.

COMPARATIVE EXAMPLE 2

A commercially available coated paper for printing, "OK Toku Art" of Oji Paper Co., Ltd., base weight 84.9 g/$m^2$, was obtained.

COMPARATIVE EXAMPLE 3

A commercially available coated paper for printing, "New Kinfuji" of Kanzaki Paper Manufacturing. Co., Ltd., base weight 84.9 g/$m^2$, was obtained.

COMPARATIVE EXAMPLE 4

A commercially available copying paper for a PPC copier "MITA DC-131" of Mita Kogyo K.K. designed for single-component, magnetic-toner development, was obtained.

COMPARATIVE EXAMPLE 5

"Xerox L", copying paper commercially available from Fuji Xerox Co., Ltd. was obtained.

Each of the papers prepared in Examples 1 to 12 and in comparative Example 1 and those mentioned in Comparative Examples 2 to 5 were subjected to measurement or evaluation with respect to the following eleven parameters:

(1) base weight; (2) thickness; (3) center-line-average roughness; (4) surface electric resistivity; (5) air permeability; (6) coefficient of static friction; (7) highlight chroma; (8) gloss of paper; (9) gloss of solid image; (10) blistering during fixing; and (11) number of problems experienced during paper feed.

The methods of measurement or evaluation of these parameters are shown below, and the results are summarized in Tables 1-1 and 1-2.

(1) Base Weight: measured by the method specified in JIS P 8124.

(2) Thickness: measured by the method specified in JIS P 8118.

(3) Center-line-average Roughness: A test piece that had been pre-treated by the method of JIS P 8111 was subjected to measurement of the center-line-average roughness of the F side by the method of JIS B 0601 with a SURFCORDER SE-3C (universal surface profile meter of Kosaka Laboratory Co., Ltd.) at a cutoff value of 0.8 mm for a sampling length of 8 mm.

(4) Surface Electric Resistivity: A test piece that had been pre-treated at temperature of 20±2° C. and relative humidity of 85±2% according to the method of JIS P 8111 was subjected to measurement of the surface resistivity of the F side according to the method of surface resistivity measurement specified in JIS C 2122 with the same condition as in the pre-treatment. The test equipment used was a P-601 (ambient temperature measuring chamber of Kawagushi Electric Works Co., Ltd.) and a HIGH RESISTANCE METER 4329A of Yokokawa-Hewlett Packard Co., Ltd. The applied voltage was 100 volts.

(5) Air Permeability: measured by the method of JIS P 8117

(6) Coefficient of Static Friction: As for the smooth-surfaced papers prepared in Examples 1-12 and Comparative Example 1, a stack of 500 sheets was cut with guillotine cutter to A4 size, and a stack of about 100 successive sheets, from which several tens of sheets on the top had been removed, was used as a test sample. As for the commercial products mentioned in Comparative Examples 2-5, their packaging was opened and a stack of about 100 successive sheets likewise was used as a test sample for each product. According to the method specified in J. TAPPI No. 30, each test sample was fixed on a B4-sized horizontal plate and the coefficient of static friction was measured successively for up to 10 sheets. The topmost sheet in the sample was fixed to the underside of a weight by means of double-sided adhesive tape. The test equipment used was a TENSILON UTM-III-100 of Toyo Baldwin Co., Ltd.

(7) Highlight Chroma: A yet to be fixed halftone image (175 lines and 5-85% dot area) that was formed with a magenta-colored toner on a copier, Model 3890 of Fuji Xerox Co., Ltd. was transferred to the F side of each sample of paper. The image was then fixed with a two-side heating apparatus employing silicone-rubber coated rolls. Spectrophotometric colorimetry was conducted for each gradation of tone by the method specified in JIS Z 8722, and the calculated values of x, y and Y were used to determine chroma, C, by the method of JIS Z 8721. The specific area of each dot was measured and the relationship between chroma C and the specific dot area was determined by the method of least squares. The chroma C for a specific dot area of 0.4 was calculated from this relation and was used as the high-light chroma. The equipment for measurement was a SPECTROPHOTOMETER H 330 of Hitachi Co., Ltd. and a BEUVAC of Toyo Ink Manufacturing. Co., Ltd.

(8) Gloss of Paper: The gloss of the F side of each sample was measured according to the method of JIS P 8142 using a GARDNER GLOSSGARD III of Gardner Corporation.

(9) Gloss of Solid Image: A solid magenta-colored image was formed on the F side of each sample by the same method as was used for highlight chroma measurement. The gloss of this solid image was measured by the same method as was used for the measurement of gloss of paper.

(10) Blistering During Fixing: As in (7), magenta-colored halftone images were fixed with the temperature of the silicone-rubber coated rolls being set to 180° C. or 200° C. The occurrence of blisters in the fixed images was visually evaluated. Each of the papers under test had been pre-treated at temperature of 20±2° C. and relative humidity (RH) of 85±2% according to the method of JIS P 8111. The results were evaluated by the following criteria: ○: blisters undetectable, Δ: blisters detected in no more than a tenth of the surface area of paper, X: blisters detected in more than a tenth of the surface area of paper.

(11) Incidence of Problems During Paper Feed: A stack of 500 sheets was taken for each of the paper samples by the same method as used in (6) and set on the feed tray in a copier, Model 5870 of Fuji Xerox Co., Ltd. A thousand copies were produced for each sample, except for those mentioned in Comparative Examples 1 to 3, for each of which 100 copies were produced. The incidence of problems was determined by totalling the number of any problems that occurred during copying, such as jamming or multiple sheets feeding.

TABLE 1-1

| Run. No. | Base Weight (g/m²) | Thickness (μm) | Center-line average Roughness (μm) | Surface Electrical Resistivity (Ω) at 20° C. × 85% RH | Air Permeability (sec) | Coefficient of Static Friction | |
|---|---|---|---|---|---|---|---|
| | | | | | | Average | S.D. |
| Example 1 | 82.7 | 73 | 1.8 | $3.5 \times 10^8$ | 1430 | 0.62 | 0.03 |
| Example 2 | 101.7 | 82 | 1.4 | $4.2 \times 10^8$ | 600 | 0.41 | 0.01 |
| Example 3 | 95.6 | 83 | 0.6 | $1.2 \times 10^8$ | 4000 | 0.73 | 0.06 |
| Example 4 | 94.3 | 80 | 1.0 | $1.1 \times 10^8$ | 2900 | 0.61 | 0.02 |
| Example 5 | 97.6 | 91 | 0.8 | $1.3 \times 10^8$ | 490 | 0.70 | 0.03 |
| Example 6 | 94.6 | 78 | 0.7 | $1.2 \times 10^9$ | 2900 | 0.64 | 0.02 |
| Example 7 | 103.5 | 88 | 1.2 | $3.5 \times 10^9$ | 1300 | 0.50 | 0.03 |
| Example 8 | 100.8 | 83 | 1.5 | $8.2 \times 10^9$ | 645 | 0.41 | 0.01 |
| Example 9 | 99.5 | 83 | 1.4 | $3.6 \times 10^9$ | 1090 | 0.58 | 0.05 |
| Example 10 | 82.6 | 74 | 2.0 | $1.8 \times 10^9$ | 2500 | 0.60 | 0.04 |
| Example 11 | 97.6 | 91 | 0.7 | $1.3 \times 10^9$ | 450 | 0.68 | 0.02 |
| Example 12 | 94.5 | 79 | 0.8 | $1.2 \times 10^9$ | 3950 | 0.47 | 0.03 |
| Comparative Example 1 | 100.1 | 84 | 0.9 | $4.1 \times 10^8$ | 25000 | 0.74 | 0.07 |
| Comparative Example 2 | 84.6 | 68 | 0.7 | $2.6 \times 10^8$ | 8500 | 0.61 | 0.08 |
| Comparative Example 3 | 86.7 | 71 | 0.8 | $2.6 \times 10^8$ | 5400 | 0.66 | 0.06 |
| Comparative Example 4 | 69.7 | 79 | 2.3 | $1.5 \times 10^{10}$ | 200 | 0.71 | 0.01 |
| Comparative Example 5 | 65.1 | 83 | 2.4 | $2.7 \times 10^9$ | 25 | 0.57 | 0.01 |

TABLE 1-2

| Run No. | Highlight Chroma | Gloss of Paper (%) | Gloss of Solid Image (%) | Blistering during fixing | | Number of Problems Experienced during Paper Feed |
|---|---|---|---|---|---|---|
| | | | | 180° C. | 200° C. | |
| Example 1 | 5.00 | 18.9 | 56.6 | ○ | ○ | 4 |
| Example 2 | 5.20 | 32.9 | 58.0 | ○ | ○ | 0 |
| Example 3 | 5.10 | 42.9 | 63.8 | ○ | Δ | 7 |
| Example 4 | 5.30 | 42.1 | 69.6 | ○ | ○ | 0 |
| Example 5 | 4.60 | 52.0 | 38.5 | ○ | ○ | 2 |
| Example 6 | 5.15 | 43.7 | 59.6 | ○ | ○ | 0 |
| Example 7 | 5.40 | 35.6 | 69.6 | ○ | ○ | 2 |
| Example 8 | 5.05 | 20.0 | 53.1 | ○ | ○ | 0 |
| Example 9 | 5.10 | 32.9 | 57.8 | ○ | ○ | 5 |
| Example 10 | 5.30 | 10.9 | 46.8 | ○ | ○ | 3 |
| Example 11 | 4.40 | 50.9 | 43.2 | ○ | ○ | 0 |
| Example 12 | 5.10 | 41.4 | 71.6 | ○ | Δ | 2 |
| Comparative Example 1 | 4.70 | 45.9 | 48.1 | X | X | 15 |
| Comparative Example 2 | 4.50 | 72.2 | 49.0 | X | X | 20 |
| Comparative Example 3 | 4.55 | 57.4 | 53.6 | Δ | X | 11 |
| Comparative Example 4 | 3.80 | 4.2 | 59.6 | ○ | ○ | 0 |
| Comparative Example 5 | 4.00 | 6.1 | 49.6 | ○ | ○ | 0 |

As one can readily see from the data in Tables 1-1 and 1-2, in order to avoid the occurrence of blisters in more than one tenth of the surface area of paper during fixing, the air permeability of the paper must not exceed 4,000 seconds, and more preferably 2,900 seconds. If the air permeability is very low, for example 490 seconds, as in the sample prepared in Example 5, the strength of the coating decreases to cause a drop in the gloss of solid image. In order to avoid this problem, the air permeability of the paper should be at least about 600 seconds. It was also found experimentally that better results were obtained when papers that satisfied the requirement for an air permeability of no more than 4,000 seconds also had surface resistivity of at least $8.0 \times 10^8$ ohms, preferably at least $1.0 \times 10^9$ ohms.

For the paper feed system used in the experiment, the number of problems that occurred during copying was considered acceptable if it was no more than 5 per 1,000 copies. According to the data shown in Tables 1-1 and 1-2 in order to attain this acceptable value, the standard deviation of the coefficient of friction between sheets of paper in a stack should not exceed 0.05. To reduce the incidence of problems to substantially zero, the standard deviation should be 0.02 or below.

The present invention provides a paper for receiving toner image in electrophotography that comprises raw paper coated on at least one side with a receiving layer having a center-line-average surface roughness of no more than 2.0 micrometer and which is conditioned to have an air permeability of no more than 4,000 seconds. This paper will produce copies with high-quality image without blistering during the fixing step of an electrophotographic process. An even better paper can be attained by conditioning the receiving layer to have a surface electrical resistivity of at least $8.0 \times 10^8$ ohms at a temperature of 20° C. and a relative humidity of 85%. A paper prepared by coating this layer on at least one side of raw paper is capable of receiving a developed toner image to produce copies with consistently high-quality images having a glossy appearance. A highly satisfactory paper can also be attained by conditioning the receiving layer such that the standard deviation of the coefficient of static friction between sheets of paper in a stack will not exceed 0.05. A paper prepared by coating this layer on at least one side of raw paper will produce copies with a high-quality image without causing any problems during paper feeding, such as jamming or the multiple sheets feeding.

Various modifications and variations may be made in the invention without departing from the scope or spirit of the invention.

We claim:

1. An electrophotographic image transfer paper for a copier including a fixing operation, comprising:

a sheet of raw paper; and a receiving layer on the paper for reducing blistering of the sheet during fixing of an image on the sheet, the receiving layer including a coating on at least one side of the sheet, said coating comprising pigments and adhesives, wherein the pigment to adhesive ratio, the pigment average particle size, and the coating weight are capable of providing a center-line average surface roughness not more than 2.0 micrometers and an air permeability less than or equal to 4,000 seconds.

2. A paper according to claim 1, wherein said coating has a coating weight ranging from 5 to 30 $g/m^2$ per one side.

3. A paper according to claim 2, wherein the ratio of the pigment to adhesive in the coating is within the range of 95:5 to 60:40.

4. A paper according to claim 2, wherein the pigment has an average particle size of 1.5 micrometer or less.

5. A paper according to claim 1, wherein said coating has a surface electrical resistivity of at least $8\times10^8$ ohms measured at a temperature of 20° C. and a relative humidity of 85%.

6. A paper according to claim 1, wherein the standard deviation of the coefficient of static friction between adjacent sheets of paper in a stack is less than or equal to 0.05.

7. A paper according to claim 6, wherein the coated layer includes a lubricant in an amount from 0.1% to 5%.

8. A paper according to claim 6, wherein the coated layer includes a coarse-grained pigment in an amount from 1% to 10%.

9. The paper of claim 5, wherein the coating has a surface electrical resistivity of at least $1\times10^9$ ohms measured at a temperature of 20° C. and a relative humidity of 85%.

10. The paper of claim 6, wherein the standard deviation of the coefficient of static friction between adjacent sheets in a stack is less than or equal to 0.02.

11. The paper of claim 1, wherein the coating has an air permeability of at least 600 seconds.

12. The paper of claim 2, wherein the pigment has an average particle size of 1.0 micrometer or less.

13. The paper of claim 2, wherein said ratio of pigment to adhesive in said coating is within the range of 95:5 to 70:30.

14. The paper of claim 13, wherein said center-line average surface roughness is not more than 1.5 micrometers.

* * * * *